(12) United States Patent
Narukawa et al.

(10) Patent No.: US 8,167,478 B2
(45) Date of Patent: May 1, 2012

(54) KNEADING SCREW AND EXTRUDER

(75) Inventors: Yutaka Narukawa, Takasago (JP);
Yoshimitsu Tanaka, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 737 days.

(21) Appl. No.: 12/267,902

(22) Filed: Nov. 10, 2008

(65) Prior Publication Data

US 2009/0161476 A1      Jun. 25, 2009

(30) Foreign Application Priority Data

Dec. 19, 2007   (JP) .................. 2007-327383

(51) Int. Cl.
*B01F 7/08*   (2006.01)
(52) U.S. Cl. .................. 366/79; 366/88; 366/89
(58) Field of Classification Search .............. 366/79, 366/88, 89
See application file for complete search history.

(56) References Cited

FOREIGN PATENT DOCUMENTS

| JP | 9-117954 | 5/1997 |
|---|---|---|
| JP | 11-300737 | 11/1999 |
| JP | 2000-296517 | 10/2000 |
| JP | 2004-202871 | 7/2004 |

OTHER PUBLICATIONS

Office Action issued Jan. 11, 2011, in Japanese Patent Application No. 2007-327383 (with English translation).

*Primary Examiner* — Joseph Del Sole
*Assistant Examiner* — James Sanders
(74) *Attorney, Agent, or Firm* — Oblon, Spivak, McClelland, Maier & Neustadt, L.L.P.

(57) ABSTRACT

A kneading screw is disclosed which comprises a screw body, the screw body comprising a feed section and a kneading section, the feed section comprising screw segments for feeding a to-be-kneaded material to a downstream side and the kneading section comprising kneading segments for kneading the material. The screw body is provided within the kneading section with a multi-stage portion which gradually changes axially in rotating outside diameter. It is preferable that the multi-stage portion be constituted by kneading segments of plural kneading discs different in rotating outside diameter. With such a construction, it is possible to avoid stress concentration on an axial part of the kneading screw and thereby prevent breaking of a spline shaft and abnormal wear of kneading flights.

8 Claims, 6 Drawing Sheets

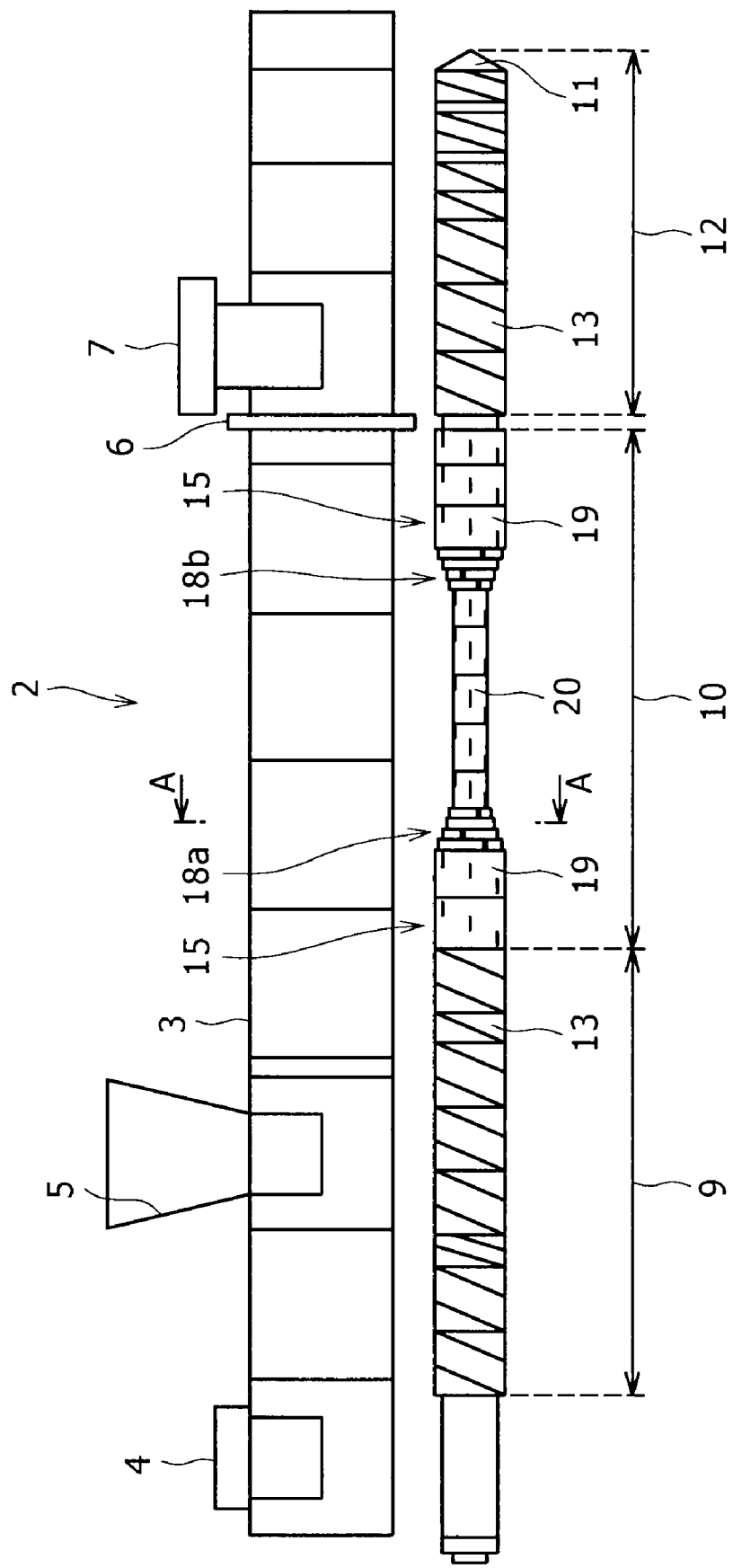

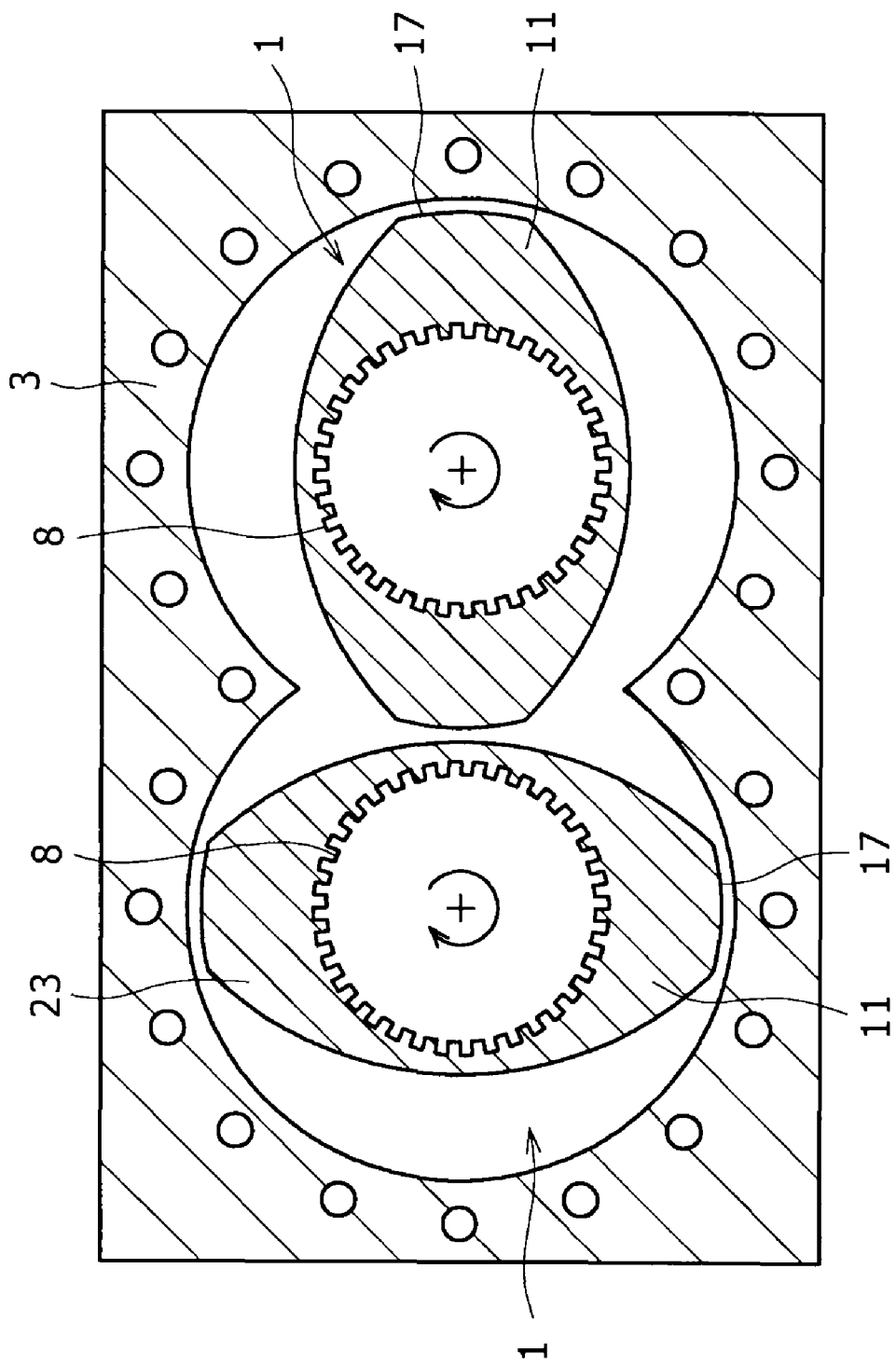

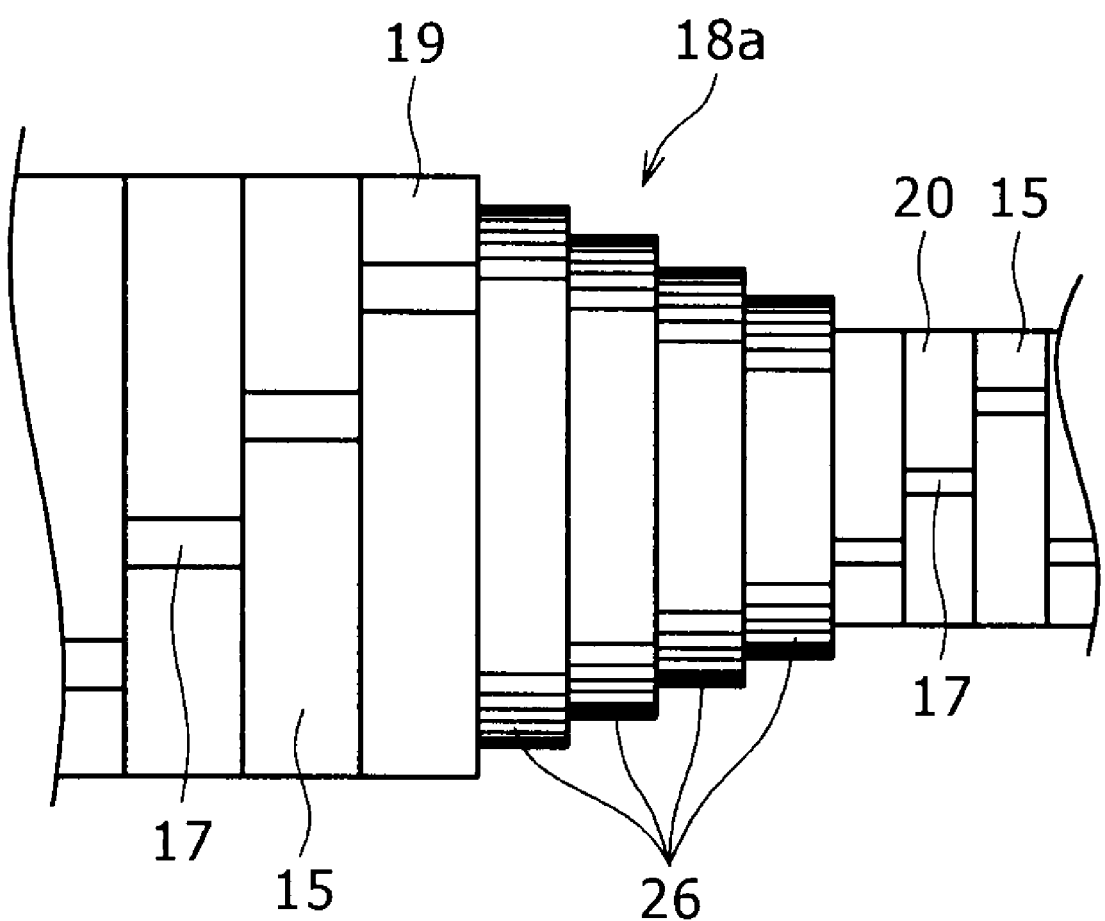

KNEADING SCREW AND EXTRUDER

BACKGROUND OF THE INVENTION

1. Field of the Invention

The present invention relates to a kneading screw and an extruder provided with the kneading screw.

2. Description of the Related Art

Generally, a compound resin material such as a plastic compound is produced by supplying pellets of a polymeric resin as a matrix material and a powdered additive into a barrel of an extruder and feeding them to a downstream side while kneading them with a kneading screw inserted into the barrel. The kneading screw includes an axial combination of plural segments of different types to axially form sections which exhibit different functions. As examples of such sections exhibiting different functions, there are a feed section for feeding materials to the downstream side, and a kneading section for kneading the materials.

As segments which constitute the kneading section, there are used such kneading segments as a rotor segment and a kneading disc segment. These kneading segments are provided with kneading flights, whereby a large shear force is imparted to materials, making it possible to knead the materials. However, also from the materials, a large force as a reaction force against the shear force is apt to be exerted on the kneading flights.

If the force applied to the kneading screw through the kneading flights is large, there is the possibility that the kneading screw will rotate in a deflected state. In this case, ends of the kneading flights come into contact with the inner wall of the barrel and damage called wear is apt to occur. For preventing the occurrence of such wear it has been considered effective to form a large tip clearance between the barrel and the kneading flights.

For example, in Japanese Patent Laid-Open Publication No. Hei 9 (1997)-117954 there is disclosed a kneading screw wherein a rotating outside diameter of each kneading flight in the kneading section is set at 0.95-0.98 relative to the other sections than the kneading section and is thus made larger in tip clearance than in the other sections.

In Japanese Patent Laid-Open Publication No. 2000-296517 there is disclosed a kneading screw wherein two types of kneading disc segments different in rotating outside diameter are combined axially alternately although the purpose of the combination is to decrease the number of gels formed.

In the patent laid-open publications Hei 9 (1997)-117954 and 2000-296517, as a result of setting small the rotating outside diameter of the kneading screw in the kneading section relative to the other sections than the kneading section for the purpose of avoiding the occurrence of wear, there is formed a large difference in height in the radial direction between an upstream side and a downstream side of the kneading section in the kneading screw. If the kneading screw has such a difference in height, stress is apt to be concentrated in the portion where the difference in height exists, thus resulting in that bending or breakage of the kneading screw becomes easier to occur.

In this connection, in the kneading screw disclosed in the patent laid-open publication Hei 9 (1997)-117954, a lower limit is set for the rotating outside diameter to prevent the stress on a spline shaft from becoming large. However, with such a small difference in height, there still occurs wear, with a consequent possibility that there may occur abnormal wear of kneading flights.

Moreover, the stress which occurs in the portion where the difference in height is formed, i.e., the stepped portion, acts on the spline shaft repeatedly with rotation of the kneading screw. Therefore, even if the force exerted on the stepped portion is of a magnitude not causing breakage, a repeated long-term exertion thereof on the stepped portion is likely to cause fatigue fracture and breaking of the spline shaft.

SUMMARY OF THE INVENTION

The present invention has been accomplished in view of the above-mentioned problems and it is an object of the invention to provide a kneading screw not only capable of preventing abnormal wear of kneading flights but also capable of preventing breaking of a spline shaft caused by stress concentration or fatigue fracture.

For achieving the above-mentioned object the kneading screw of the present invention adopts the following technical means.

The kneading screw of the present invention comprises a screw body, the screw body comprising a feed section and a kneading section, the feed section comprising a screw segment for feeding a to-be-kneaded material to a downstream side, the kneading section comprising a kneading segment for kneading the material, the screw body further comprising a multi-stage portion having rotating outside diameters changing gradually axially, the multi-stage portion being formed in at least one of a connection between the kneading section and another section adjacent to the kneading section and the interior of the kneading section.

With such a multi-stage portion having axially gradually changing rotating outside diameters, a force (bending stress) imposed locally on the kneading screw acts dispersedly on the stepped portions which constitute the multi-stage portion. Thus, there no longer is concentration of an excessively large force on one stepped portion, and fatigue fracture also becomes difficult to occur. Consequently, it is possible to suppress breaking of the spline shaft.

It is preferable that the multi-stage portion be formed so as to compensate between two segments different in rotating outside diameter. As to the two segments different in rotating outside diameter, there is a case where they indicate the kneading section and another section adjacent thereto, or a case where they indicate one portion in the kneading section and another portion in the same section adjacent to the one portion and different in rotating outside diameter from the one portion.

The multi-stage portion may be formed within the kneading section.

The multi-stage portion may be formed in a connection between the kneading section and the feed section.

The screw body may further comprise an extruding section for extruding the material kneaded in the kneading section to the downstream side, and the multi-stage portion may be formed in a connection between the kneading section and the extruding section.

Further, it is preferable that the multi-stage portion comprises kneading segments composed of plural kneading discs that are different in rotating outside diameter from each other.

In the case where a stepped portion is formed between any of the segments constituting the multi-stage portion and a segment adjacent thereto, then if the outside diameter of a spline shaft as a steel shaft extending axially through the multi-stage portion is assumed to be D, it is preferable that each difference $\delta$ in height in the radial direction of the multi-stage portion satisfy the relation of the following expression (1):

$$\delta D^3 \leq 4.0E{-}06 \quad (1)$$

$\delta$: difference in height of each stepped portion constituting the multi-stage portion, (mm)

D: outside diameter of the spline shaft, (mm).

As long as each stepped portion of the multi-stage portion is formed at the difference in height which satisfies the relation of the above expression (1), there is no fear that the force applied to the stepped portion may become large to the extent of causing fatigue fracture of the spline shaft as a steel shaft.

And it consequently becomes possible to prevent breaking of a spline shaft as a steel shaft caused by fatigue fracture.

In the case where n number of the differences in height are present between two segments adjacent to the multi-stage portion, then if the outside diameter of the spline shaft extending axially through the multi-stage portion is assumed to be D, it is preferable that the difference Δ in rotating outside diameter between the two segments satisfy the relation of the following expression (2):

$$\Delta/D^3 \leq (4.0E-06) \times n \qquad (2)$$

Δ: difference in rotating outside diameter between two segments, (mm)
D: outside diameter of the spline shaft, (mm)
n: number of differences in height formed between the two segments.

As long as the multi-stage portion satisfying the relation of the above expression (2) is used, there is no fear that the force applied to the whole of the multi-stage portion may exceed a design strength of the spline shaft as a steel shaft or become large to the extent of fatigue fracture of the spline shaft due to stress concentration. Therefore, by forming such a multi-stage portion, it is possible to surely prevent fatigue fracture of the spline shaft as a steel shaft.

Further, in the extruder using the kneading screw described above, it is possible to prevent abnormal wear of kneading flights and breaking of the spline shaft.

With the kneading screw according to the present invention, it is possible to prevent not only abnormal wear of kneading flights but also breaking of the spline shaft caused by fatigue fracture.

With the extruder according to the present invention, abnormal wear of kneading flights and breaking of the spline shaft can be prevented.

BRIEF DESCRIPTION OF THE DRAWINGS

FIG. 1 is a front view of an extruder having a kneading screw according to a first embodiment of the present invention;

FIG. 2 is an end view taken on line A-A in FIG. 1;

FIG. 6 is a diagram showing another example of a multi-stage portion.

DETAILED DESCRIPTION OF THE PREFERRED EMBODIMENTS

Figure 3A:
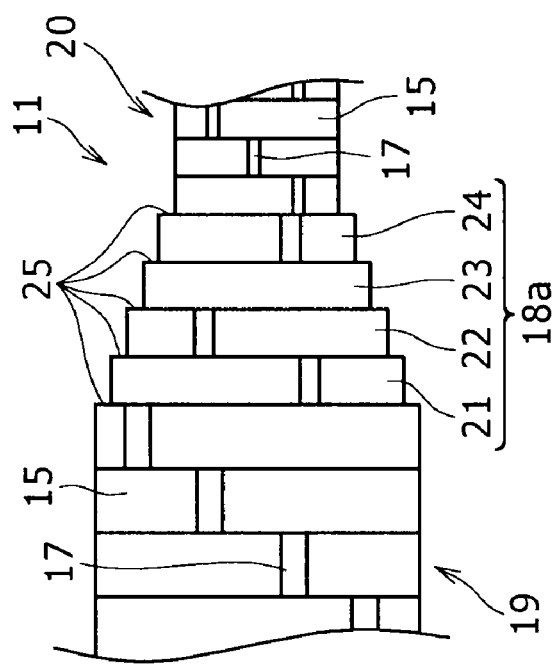
FIG. 3(a) is a front view of a multi-stage portion and FIG. 3(b) is a sectional view of segments in FIG. 3(a)

A first embodiment of the present invention will be described below with reference to drawings.

First Embodiment

As shown in FIG. 1, a kneading screw 1 of this first embodiment is installed in a same-rotating-direction intermeshed twin-screw extruder 2 (hereinafter may be referred to simply as "extruder 2"). The kneading screw 1 is installed so as to extend axially through the interior of a hollow barrel 3 of the extruder 2. The kneading screw 1 is adapted to rotate with respect to the barrel 3, whereby in the extruder 2 a material supplied into the barrel 3 is fed to a downstream side while being kneaded.

In the following description on the extruder 2 it is assumed that the left side on the paper surface of FIG. 1 is an upstream side and the right side is a downstream side and that the direction of a rotational axis of the kneading screw 1 is an axial direction. This axial direction coincides with the transverse direction on the paper surface of FIG. 1.

The barrel 3 is formed in a cylindrical shape which is long in the axial direction. The interior of the barrel 3 is formed in a hollow shape which is long in the axial direction and a pair of right and left kneading screws 1, 1 are inserted rotatably into the interior of the barrel.

The barrel 3 has a material supply port 4 on the upstream side in the axial direction so that the material can be supplied through the material supply port 4 into the hollow portion (the interior of the barrel 3). The barrel 3 is equipped with a heating device (not shown) using an electric heater or heated oil and the material supplied from the material supply port 4 is heated to a melted or semi-melted state by the heating device.

The barrel 3 has a hopper 5 on the downstream side of the material supply port 4 so that additives or the like can be supplied through the hopper 5 into the barrel 3. On the downstream side of the hopper 5 there are provided a gate 6 for damming up the material to adjust the degree of kneading, and an opening 7 for discharging gas which vaporizes from the kneaded material to the exterior of the barrel 3.

As shown in FIGS. 1 and 2, the kneading screws 1 are installed right and left in a pair so as to extend through the interior of the barrel 3. Each kneading screw 1 is composed of an axially long spline shaft 8 and plural segments which are fixed in a skewered fashion by the spline shaft 8.

There are various types of segments as segments which constitute each kneading screw 1. In each kneading screw 1, plural types of segments are combined in different patterns to form a material feed section (feed section 9) and a material kneading section (kneading section 10) each in a certain axial range. In each kneading screw 1, the material feed section and the material kneading section are combined arbitrarily to constitute a screw body 11 as a whole.

In each kneading screw 1 according to this first embodiment, as shown in FIG. 1, the screw body 11 includes, from the upstream to the downstream side, a feed section 9 for feeding the supplied material to the downstream side while melting the material, a kneading section 10 for kneading the material fed from the feed section 9, and an extruding section 12 for extruding the material kneaded in the kneading section 10 to the downstream side.

The feed section 9 is made up of plural screw segments 13 disposed in the axial direction. The screw segments 13 have screw flights (not shown) which are twisted spirally in the axial direction. By rotation of the spiral screw flights, the material is fed from the upstream to the downstream side while being melted.

The kneading section 10 is made up of plural kneading disc segments 15.

As shown in FIG. 2, the kneading disc segments 15 are constituted such that plural (five in this embodiment) plate-like kneading discs each having an elliptic section perpendicular to the axial direction are arranged continuously in the axial direction. The kneading disc segments 15 are formed so that, when the kneading screw 1 is rotated, the material is conducted to between the kneading discs and the inner wall of the barrel 3 and can be kneaded.

Although in this embodiment the kneading section 10 is made up of plural kneading disc segments 15, it may be constituted by plural rotor segments instead of the kneading disc segments 15.

Like the feeding section 9, the extruding section 12 is axially provided with screw segments 13 having spiral screw flights. The screw segments 13 of the extruding section 12 are formed so as become smaller in segment length toward the downstream side. Thus, the moving speed of the material becomes lower toward the downstream side so that the material can be pressurized.

The kneading screw 1 according to the present invention is characteristic in that multi-stage portions 18a and 18b are formed within the range of the kneading section 10 in the screw body 11. The multi-stage portions 18a and 18b change in rotating outside diameter stepwise in the axial direction and are each provided so as to be sandwiched in between segments which are greatly different in rotating outside diameter.

By the stepwise changing in rotating outside diameter it is meant that the segments which constitute the screw body 11 change in order axially in the rotating outside diameter (the diameter of a circular path described by a portion rotating on the outermost periphery side at the time of segment rotation about the axis) (the rotating outside diameter gradually becomes larger or smaller from the upstream side toward the downstream side). In this embodiment the multi-stage portions 18a and 18b are formed on the upstream side and the downstream side, respectively, of the kneading section 10 and are each made up of plural kneading discs different in rotating outside diameter, the kneading discs being arranged so as to gradually vary in rotating outside diameter. In the following description reference will be made to the upstream-side multi-stage portion 18a out of the two multi-stage portions 18a and 18b.

FIG. 3(a) is a front view of the upstream-side multi-stage portion 18a.

The screw body 11 has a first kneading disc segment 19 positioned on the upstream side in the kneading section 10 and a second kneading disc segment 20 positioned on the downstream side with respect to the first kneading disc segment 19 and smaller in rotating outside diameter than the segment 19.

The multi-stage portion 18a is made up of segments comprising four kneading discs, which are, in order from the upstream side, a first kneading disc 21, a second kneading disc 22, a third kneading disc 23 and a fourth kneading disc 24. The four kneading discs are arranged in such a manner that their flights are spaced from one another at a predetermined phase angle (60° in this embodiment) when seen from the upstream side.

Figure 3B:
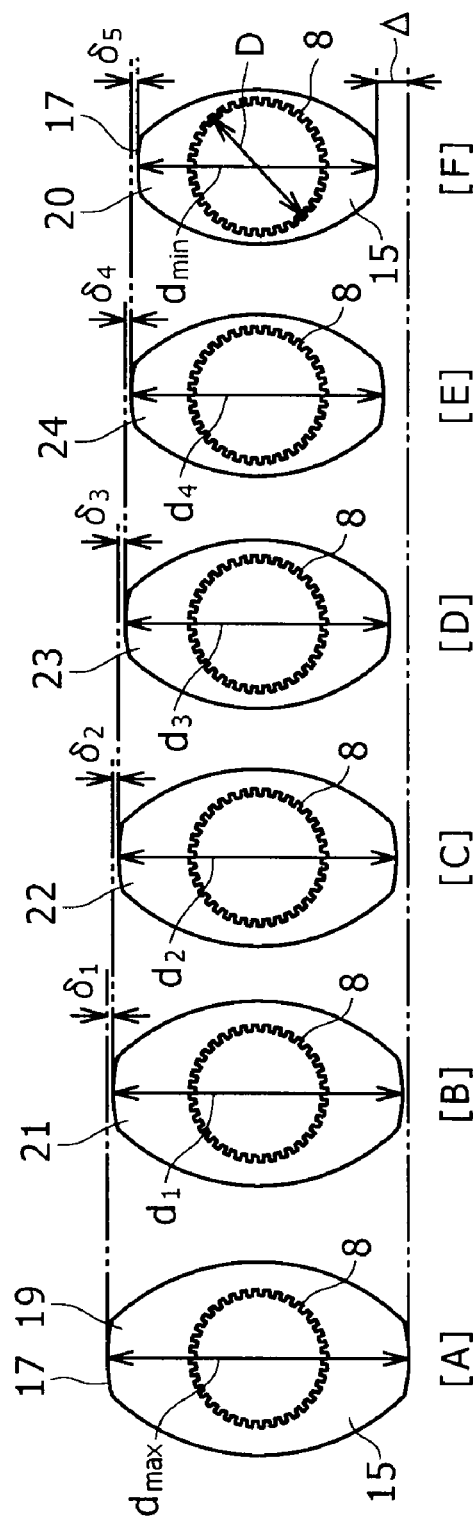

FIG. 3(b) is a sectional view obtained by cutting the multi-stage portion 18a shown in FIG. 3(a) along axially intermediate portions of the constituent discs. In FIG. 3(b), [A] to [F] show end faces of the first kneading disc segment 19, the first kneading disc 21 to the fourth kneading disc 24 and the second kneading disc segment 20, respectively.

The four kneading discs are arranged in such a manner the larger the rotating outside diameter, the more upstream side. There exists the relation of the following expression (3) between the rotating outside diameters d (d1-d4) of the kneading discs and the rotating outside diameters $d_{max}$, $d_{min}$ of the first and second kneading disc segments 19, 20:

$$d_{max} > d_1 > d_2 > d_3 > d_4 > d_{min} \quad (3)$$

$d_{max}$: rotating outside diameter of the first kneading disc segment
$d_{min}$: rotating outside diameter of the second kneading disc segment
$d_1$: rotating outside diameter of the first kneading disc
$d_2$: rotating outside diameter of the second kneading disc
$d_3$: rotating outside diameter of the third kneading disc
$d_4$: rotating outside diameter of the fourth kneading disc By providing the multi-stage portion 18a, as shown in the expression (3), a total of five stepped portions 25 are formed between the first kneading disc segment 19 and the second kneading disc segment 20. The stepped portions 25 are respectively formed with differences δ in height which are equal in the radial direction centered at the spline shaft 8. The relation of the following expression (4) exists between the differences δ in height and the rotating outside diameters d:

$$\delta_1 = (d_{max} - d_1)/2$$

$$\delta_2 = (d_1 - d_2)/2$$

$$\delta_3 = (d_2 - d_3)/2$$

$$\delta_4 = (d_3 - d_4)/2$$

$$\delta_5 = (d_4 - d_{min})/2 \quad (4)$$

In the expression (4), the aforesaid five differences in height are shown as $\delta_1$-$\delta_5$ in order from the upstream side.

On the other hand, when the spline shaft 8 and the constituent segments are made of steel and stress amplitudes acting on the stepped portions 25 are calculated, further, when it is assumed that the thus-calculated stress amplitudes are at a strength not causing fatigue fracture of the spline shaft 8, there is obtained the following expression (1'):

$$\delta_i/D^3 \leq 4.0E-06 \quad (1')$$

$\delta_i$: difference in height of each stepped portion which constitutes the multi-stage portion, (mm)
D: outside diameter of the spline shaft, (mm)
i: 1-5

By disposing the first kneading disc 21 to the fourth kneading disc 24 in such a manner that the differences in height, $\delta_1$-$\delta_5$ satisfy the foregoing expression (1'), the stepped portions 25 can each be formed in such a difference in height as does not cause fatigue fracture of the spline shaft 8 even under repeated exertion thereon of a bending force. Thus, the spline shaft 8 as a steel shaft can be protected from breaking caused by fatigue fracture.

Further, a difference Δ in rotating outside diameter exists between the first kneading disc segment 19 located on the upstream side of the multi-stage portion 18a and the second kneading disc segment 20 located on the downstream side. This difference Δ in rotating outside diameter is the sum of the five differences in height formed in the multi-stage portion 18a and satisfies the relation of the following expression (2'):

$$\Delta/D^3 = \sum_{i=1}^{5} \delta_i/D^3 \leq (4.0E-06) \times 5 \quad (2')$$

Δ: difference in rotating outside diameter between two segments, (mm)
D: outside diameter of the spline shaft, (mm)

By determining the number of differences in height in the multi-stage portion 18a so as to satisfy the above expression (2'), the force applied to the whole of the multi-stage portion 18a can be suppressed within the range of not causing fatigue fracture of the spline shaft 8 and hence it is possible to prevent fatigue fracture of the spline shaft.

Second Embodiment

Figure 4:
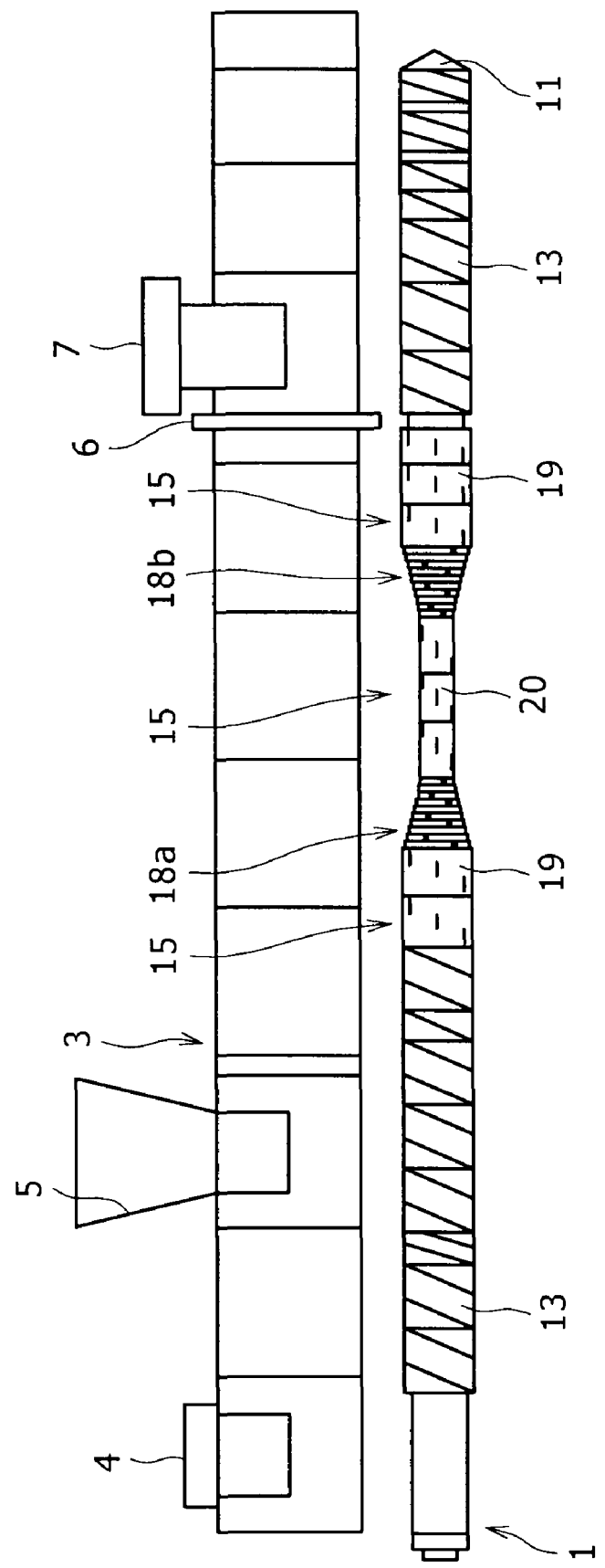
FIG. 4 is a front view of an extruder having a kneading screw according to a second embodiment of the present invention.

FIG. 4 illustrates a kneading screw 1 according to a second embodiment of the present invention. The kneading screw 1 of this second embodiment is different from the kneading screw 1 of the first embodiment in that a larger number (ten) of kneading discs than in the first embodiment are provided as constituents of each of multi-stage portions 18a and 18b. More specifically, in this second embodiment, a total of ten stepped portions 25 are formed in the multi-stage portion 18a because there are not stepped portions 25 (differences in height) between the tenth kneading disc from the upstream side and the second kneading disc segment 20.

Therefore, in the kneading screw 1 of the second embodiment, by satisfying the relations of the foregoing expressions (1) and (2) with respect to each of the ten stepped portions 25, abnormal wear of the barrel 3 caused by breaking or bending of the kneading screw 1 can be suppressed or prevented.

Other constructional points, as well as function and effect, of the kneading screw 1 of the second embodiment are the same as in the first embodiment.

Third Embodiment

Figure 5:
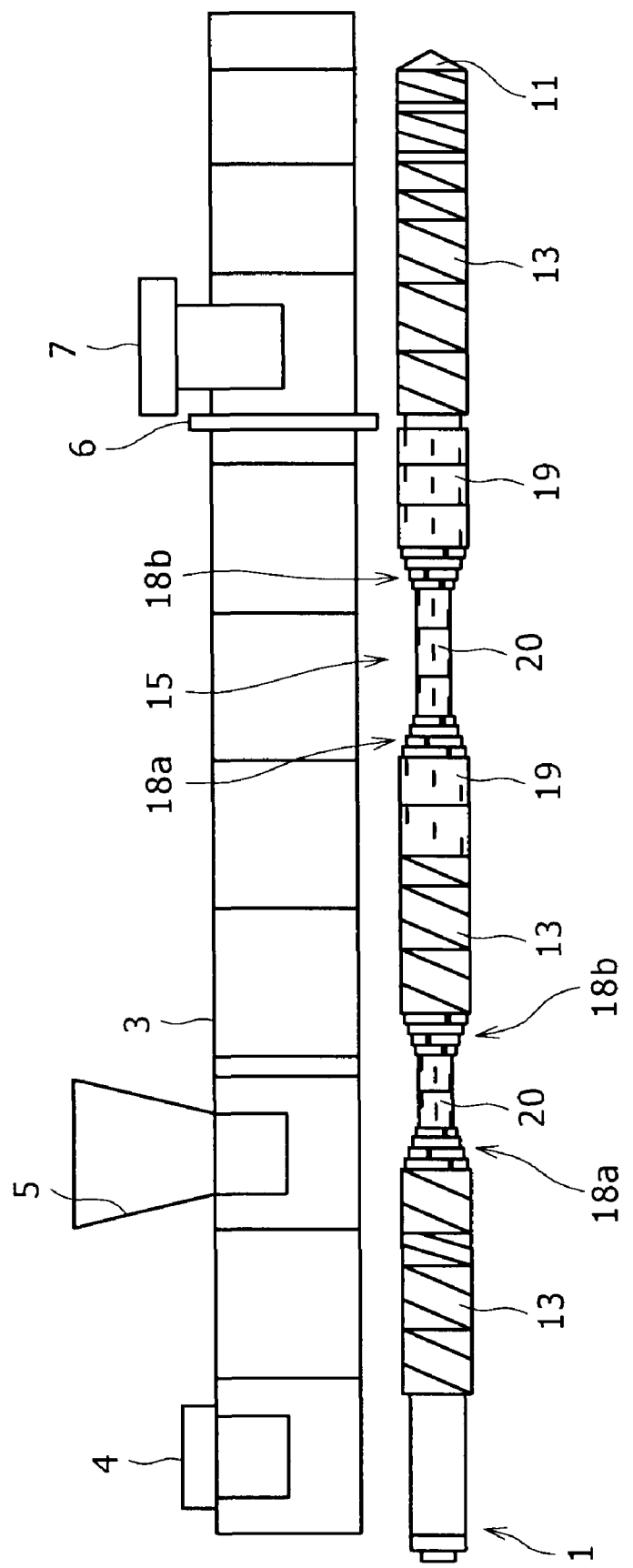
FIG. 5 is a front view of an extruder having a kneading screw according to a third embodiment of the present invention.

FIG. 5 illustrates a kneading screw 1 according to a third embodiment of the present invention. The kneading screw of this third embodiment is different in the following points from the kneading screw of the first embodiment. In the screw body 11 described in the first embodiment there is provided one kneading section 10, whereas in a screw body 11 used in this third embodiment there are provided two (plural) kneading sections 10. Further, in this third embodiment, both multi-stage portions 18a and 18b are provided in each of the plural kneading sections 10. Of the two multi-stage portions 18a, the one located on the left side in the figure is a multi-stage portion provided in the connection between the kneading section and the feed section.

By thus providing the multi-stage portions 18a and 18b in each of plural kneading sections 10, also in the kneading screw 1 provided with plural kneading sections 10, a bending force applied locally to the spline shaft 8 is borne by each of the multi-stage portions 18a and 18b in each of kneading sections 10, so that it is possible to suppress or prevent breaking of the spline shaft 8 and abnormal wear of the barrel 3.

Other constructional points, as well as function and effect, of the kneading screw 1 of this third embodiment are the same as in the first embodiment.

EXAMPLES

The present invention will be described below by way of working examples and a comparative example. For the convenience of explanation, reference will be made first to a comparative example.

Comparative Example

This comparative example is an example of a conventional completely intermeshed twin-screw extruder 2.

As shown in Table 1, the extruder 2 has a barrel 3 hollowed out in a glasses hole shape and having an inside diameter of 75 mm, and a pair of kneading screws 1 each having a spline shaft 8 (made of Nickel Chromium and Molybdenum steel) of 36 mm in shaft diameter are inserted into the interior of the barrel 3. A kneading section 10 is provided at an axially intermediate position of each kneading screw 1. In the kneading section 10 there is formed a difference (0.2 mm) in height defined by both first kneading disc segment 19 (rotating outside diameter 74.7 mm) and second kneading disc segment 20 (rotating outside diameter 74.3 mm) which are different in rotating outside diameter.

TABLE 1

| Comparative Example 1 | Barrel | Inside dia. 75 mm |
|---|---|---|
| | Spline shaft | Shaft dia. 36 mm |
| | First kneading disc segment | Rotating outside dia. 74.7 mm |
| | Second kneading disc segment | Rotating outside dia. 74.3 mm |
| | Multi-stage portion | Number of kneading disc: 0 |
| | | Number of difference in height: 1, |
| | | Length: 75 mm |
| | | Each difference in height: 0.2 mm |

If calculation is made to check whether the above difference in height satisfies the relation of the foregoing expression (1), the result is as follows:

$$\delta/D^3 = 0.2/36^3 = 4.29E-6 > 4.0E-6$$

Thus, it is seen that the relation of the expression (1) does not exist in the comparative example. If calculation is made to check whether the aforesaid difference in height satisfies the relation of the expression (2), the result is as follows:

$$\Delta/D^3 = 0.2 \times 1/36^3 = 4.29E-6 > (4.0E-6) \times 1$$

Thus, it is seen that the relation of the expression (2) does not exist, either, in the comparative example.

Next, a check is made to see if the kneading screw 1 of the comparative example thus not satisfying the relations of the expressions (1) and (2) undergoes fatigue fracture or not.

In such a twin-screw extruder 2 as described above, it is here assumed that the kneading screw 1 is rotated under the conditions of an output of 90 kW and a number of revolutions of 360 rpm. Torsional torque and transfer torque imposed on the kneading screw 1 can be determined on the basis of the output and number of revolutions. In the case of the comparative example, torsional torque and transfer torque imposed on the kneading screw 1 are 121.8 kgfm and 49 kgfm, respectively.

In accordance with a numerical calculation using the above torsional torque and transfer torque, as well as FEM (finite element method) of stress imposed on the dedendum of the spline shaft 8, it is possible to determine torsional stress $\tau$ (shear stress $\tau$) of the spline shaft 8, bending stress $\sigma b$ of the teeth of the spline shaft 8 and bending stress $\sigma M$ of the spline shaft 8. In Example 1, $\tau = 23.06$ kgf/mm$^2$, $\sigma b = 19.96$ kgf/mm$^2$, and $\sigma M = \pm 40$ kgf/mm$^2$.

As to combined stresses of bending and torsion, there is known a method using Mohr's stress circle and the following results are obtained in accordance with the stresses obtained previously:

(Under Tension)

$$\sigma 1 = (\sigma b + \sigma M)/2 + (\frac{1}{2})((\sigma b - \sigma M)^2 + 4\tau^2)^{1/2} = 55.07 \text{ kgf/mm}^2$$

$$\sigma 2 = (\sigma b + \sigma M)/2 - (\frac{1}{2})((\sigma b - \sigma M)^2 + 4\tau^2)^{1/2} = 4.82 \text{ kgf/mm}^2$$

$$\sigma T = \sigma 1 - \sigma 2 = 50.26 \text{ kgf/mm}^2$$

$$\tau = (\sigma T/2) = 25.13 \text{ kgf/mm}^2$$

(Under Compression)

$$\sigma 1 = (\sigma b + \sigma M)/2 + (\frac{1}{2})((\sigma b - \sigma M)^2 + 4\tau^2)^{1/2} = 27.81 \text{ kgf/mm}^2$$

$$\sigma 2 = (\sigma b + \sigma M)/2 - (\frac{1}{2})((\sigma b - \sigma M)^2 + 4\tau^2)^{1/2} = -47.78 \text{ kgf/mm}^2$$

$$\sigma T = \sigma 1 - \sigma 2 = 75.59 \text{ kgf/mm}^2$$

$$\tau = (\sigma T/2) = 37.79 \text{ kgf/mm}^2$$

Next, if mean stresses and stress amplitudes under tension and under compression are determined using Mohr's stress circle, there are obtained the following results:
(Under Tension)
$\sigma 1_m = 27.18$ kgf/mm$^2$ $\sigma 1_a = 27.89$ kgf/mm$^2$
$\sigma 2_m = -7.22$ kgf/mm$^2$ $\sigma 2_a = 12.04$ kgf/mm$^2$
(Under Compression)
$\sigma 1_m = 31.97$ kgf/mm$^2$ $\sigma 1_a = 4.15$ kgf/mm$^2$
$\sigma 2_m = -12.00$ kgf/mm$^2$ $\sigma 2_a = 35.78$ kgf/mm$^2$ On the other hand, an allowable stress amplitude $\sigma_{a1}$ at mean stress $\sigma_m$ of Nickel Chromium and Molybdenum steel which constitutes the spline shaft 8 is determined from a fatigue limit diagram. This fatigue limit diagram is prepared on the basis of a modified Goodman relationship in case of a tensile strength $\sigma_B$ being 110 kgf/mm$^2$, yield stress $\sigma_y$ 90.3 kgf/mm$^2$ and fatigue limit under completely reversed bending, $\sigma_w$, 37 kgf/mm$^2$.

Under tension, an allowable stress amplitude $\sigma_{a1}$ at a mean stress $\sigma_m$ of 27.18 kgf/mm$^2$ is 27.86 kgf/mm$^2$ as mentioned above in accordance with the fatigue limit diagram. Therefore, $\sigma_a=27.89$ kgf/mm$^2 \geqq 27.86$ kgf/mm$^2=\sigma_{a1}$, from which it is seen that there is a possibility of occurrence of fatigue fracture.

On the other hand, under compression, an allowable stress amplitude $\sigma_{a1}$ at a mean stress $\sigma_m$ of 13.90 kgf/mm$^2$ is 37 kgf/mm$^2$ as mentioned above likewise from the fatigue limit diagram. Therefore, $\sigma_a=33.87$ kgf/mm$^2<37$ kgf/mm$^2=\sigma_{a1}$, from which it is seen that fatigue fracture does not occur.

From the above it is judged that fatigue fracture of the kneading screw occurs in the comparative example wherein the relations of the expressions (1) and (2) do not exist.

Example 1

Example 1 is different from the comparative example in point of using a screw body 11 having multi-stage portions 18a and 18b. In Example 1, as shown in Table 2, the multi-stage portions 18a and 18b are each made up of four kneading disc segments different in rotating outside diameter, and a total of five differences in height are formed between a first rotor segment 19 located on the upstream side of the multi-stage portion 18a and a second rotor segment 20 located on the downstream side thereof. Other constructional points and experimental conditions in Example 1 are the same as in the comparative example and therefore an explanation thereof is here omitted.

TABLE 2

| Example 1 | Barrel | Inside dia. 75 mm |
|---|---|---|
| | Spline shaft | Shaft dia. 36 mm |
| | First kneading disc segment | Rotating outside dia. 74.7 mm |
| | Second kneading disc segment | Rotating outside dia. 74.3 mm |
| | Multi-stage portion | Number of kneading disc: 4 |
| | | Number of difference in height: 5, |
| | | Length: 75 mm |
| | | Each difference in height: 0.04 mm |

At the multi-stage portion 18a in Example 1, the five differences in height are equal in size and therefore each difference in height is one fifth of the difference in height in the comparative example. That is, if calculation is made to check whether the relation of the expression (1) is satisfied or not, the result is as follows:

$$\delta/D^3=0.04/36^3=8.57E-7 \leqq 4.0E-6$$

Thus, the relation of the expression (1) is satisfied in Example 1. If calculation is made to check whether the relation of the expression (2) is satisfied or not, the result is as follows:

$$\Delta D^3=0.04 \times 5/36^3=4.29E-6 \leqq 2.0E-5=(4.0E-6) \times 5$$

Thus, the relation of the expression (2) is also satisfied in Example 1.

On the other hand, if mean stresses and stress amplitudes under tension and under compression in Example 1 are determined in the same way as in the comparative example, the results are as follows:

(Under Tension)
$\sigma1_m=31.47$ kgf/mm$^2$ $\sigma1_a=7.09$ kgf/mm$^2$
$\sigma2_m=-11.51$ kgf/mm$^2$ $\sigma2_a=2.89$ kgf/mm$^2$
(Under Compression)
$\sigma1_m=32.05$ kgf/mm$^2$ $\sigma1_a=0.44$ kgf/mm$^2$
$\sigma2_m=-12.09$ kgf/mm$^2$ $\sigma2_a=10.42$ kgf/mm$^2$ Further, an allowable stress amplitude $\sigma_{a1}$ at a mean stress $\sigma_m$ of Nickel Chromium and Molybdenum steel which constitutes the spline shaft 8 is determined from the fatigue limit diagram.

First, under tension, the allowable stress amplitude $\sigma_{a1}$ at a mean stress $\sigma_m$ of 31.47 kgf/mm$^2$ is 26.41 kgf/mm$^2$ as mentioned above from the fatigue limit diagram. Therefore, $\sigma_a=7.09$ kgf/mm$^2<26.41$ kgf/mm$^2=\sigma_{a1}$, from which it is seen that fatigue fracture does not occur.

Under compression, as mentioned above, the allowable stress amplitude $\sigma_{a1}$ at a mean stress $\sigma_m$ of $-12.09$ kgf/mm$^2$ is made the same $\sigma_{a1}=37$ kgf/mm$^2$ as that at $\sigma_m=0$ kgf/mm$^2$. Consequently, $\sigma_a=10.42$ kgf/mm$^2<37$ kgf/mm$^2=\sigma_{a1}$, from which it is seen that fatigue fracture does not occur.

From the above, it is judged that fatigue fracture of the kneading screw does not occur in Example 1 in which the relations of the expressions (1) and (2) exist.

Example 2

Like Example 1, Example 2 is different from the comparative example also in point of using a screw body 11 having multi-stage portions 18a and 18b. A different point of Example 2 from Example 1 resides in that the multi-stage portions 18a and 18b formed therein are each made up of ten kneading discs different in rotating outside diameter, as shown in Table 3. More specifically, at the multi-stage portion 18a in Example 2, a total of ten differences in height are formed between a first kneading disc segment 19 located on the upstream side and a second kneading disc segment 20 located on the downstream side. Other constructional points and experimental conditions in Example 2 are the same as in Example 1 and therefore an explanation thereof is here omitted.

TABLE 3

| Example 2 | Barrel | Inside dia. 75 mm |
|---|---|---|
| | Spline shaft | Shaft dia. 36 mm |
| | First kneading disc segment | Rotating outside dia. 74.7 mm |
| | Second kneading disc segment | Rotating outside dia. 74.3 mm |
| | Multi-stage portion | Number of kneading disc: 10 |
| | | Number of difference in height: 10, |
| | | Length: 75 mm |
| | | Each difference in height: 0.02 mm |

Also in the case of the multi-stage portion 18a in Example 2 all the differences in height are equal in size, so the size of each difference in height is one tenth (0.02 mm) of the difference in height in the comparative example. Therefore, if calculation is made to check whether the relation of the expression (1) is satisfied or not, the result is as follows:

$$\delta/D^3=0.02/36^3=4.29E-7 \leqq 4.0E-6$$

Thus, the relation of the expression (1) is satisfied also in Example 2.

Further, if calculation is made to check whether the relation of the expression (2) is satisfied or not, the result is as follows:

$$\Delta D^3=0.02 \times 10/36^3=4.29E-6 \leqq 4.0E-5=(4.0E-6) \times 10$$

Thus, the relation of the expression (2) is also satisfied in Example 2.

On the other hand, also in Example 2, by determining a mean stress $\sigma_m$ as in Example 1 and comparing it with the allowable stress amplitude $\sigma_{a1}$ in the fatigue limit diagram, it is seen that the kneading screw does not undergo fatigue fracture. The details of this point are the same as in Example 1, so are omitted here.

Thus, also in Example 2 which satisfies the relations of the expressions (1) and (2), it is seen that fatigue fracture does not occur.

The present invention is not limited to the above embodiments, but the shape, structure, material and combination of the constituent members may be changed suitably within the scope not altering the essence of the present invention.

For example, although the kneading screws 1 of the above first to third embodiments are of the completely intermeshed twin-screw extruder 2, the present invention is applicable also to a single or three- or more-screw extruder 2, or a twin-screw extruder 2 which is not a completely intermeshed type, or a continuous kneading machine.

Each of the stepped portions 25 in each of the multi-stage portions 18a and 18b have differences in height of an equal size in the radial direction of the spline shaft 8 in the above embodiments. However, the stepped portions 25 may be formed so as to have differences in height of different values insofar as the relations of the expressions (1) and (2) are satisfied.

In the above embodiments the multi-stage portions 18a and 18b are each constituted by divided type kneading disc segments of a plurality of separate kneading discs provided in the kneading section 10. However, the multi-stage portions 18a and 18b may be such integral type segments as the outer periphery surface being formed in steps, or other segments than the kneading disc segments may be used as the constituent segments of the multi-stage portions 18a and 18b. For example, the multi-stage portions 18a and 18b may be constituted by plural rotor segments 15 having rotating outside diameters which change in a successive manner. A multiple ∞-stage portion can also be formed by changing the rotating outside diameter of one rotor segment in a continuous manner. In the case where the multi-stage portions 18a and 18b are provided in the kneading section 10, they may be formed for example by stacking plural discs 26 of different diameters axially as in FIG. 6 or may be formed as a truncated cone-like spacer.

The multi-stage portions may be provided in the connection between the kneading section 10 and the extruding section 12.

As the material of the spline shaft 8 (screw shaft) there may be used not only Nickel Chromium and Molybdenum steel but also Chromium and Molybdenum steel.

What is claimed is:

1. A kneading screw comprising:
   a screw body comprising a feed section and a kneading section, said feed section comprising a screw segment for feeding a to-be-kneaded material to a downstream side, said kneading section comprising a kneading segment for kneading the material,
   said screw body further comprising a multi-stage portion having rotating outside diameters changing gradually axially, said multi-stage portion being formed in at least one of a connection between said kneading section and another section adjacent to said kneading section, and the interior of said kneading section,
   wherein when a stepped portion is formed between any of said segments constituting said multi-stage portion and a segment adjacent thereto, if the outside diameter of a spline shaft as a steel shaft extending axially through said multi-stage portion is assumed to be D, each difference δ in height in the radial direction of said multi-stage portion satisfies the relation of the following expression (1):

$$\delta/D^3 \leq 4.0E{-}06, \text{ where}$$

δ: difference in height of each stepped portion constituting said multi-stage portion, (mm),
   D: outside diameter of said spline shaft, (mm).

2. The kneading screw according to claim 1, wherein said multi-stage portion is formed so as to compensate between two segments different in rotating outside diameter.

3. The kneading screw according to claim 1, wherein said multi-stage portion is formed within said kneading section.

4. The kneading screw according to claim 2, wherein said multi-stage portion is formed in a connection between said kneading section and said feed section.

5. The kneading screw according to claim 2, wherein said screw body further comprises an extruding section for extruding the material kneaded in said kneading section to the downstream side, and said multi-stage portion is formed in a connection between said kneading section and said extruding section.

6. The kneading screw according to claim 1, wherein said multi-stage portion comprises kneading segments of plural kneading discs different in rotating outside diameter.

7. The kneading screw according to claim 1, wherein when n number of said differences in height are present between two segments adjacent to said multi-stage portion, if the outside diameter of said spline shaft extending axially through said multi-stage portion is assumed to be D, the difference Δ in rotating outside diameter between said two segments satisfies the relation of the following expression (2):

$$\Delta/D^3 \leq (4.0E{-}06) \times n \tag{2}$$

Δ: difference in rotating outside diameter between two segments, (mm)
D: outside diameter of said spline shaft, (mm)
n: number of differences in height formed between said two segments.

8. An extruder comprising said kneading screw described in claim 1.

* * * * *